US009645281B2

(12) United States Patent
Srivastava et al.

(10) Patent No.: US 9,645,281 B2
(45) Date of Patent: May 9, 2017

(54) GEOSTATISTICAL PROCEDURE FOR SIMULATION OF THE 3D GEOMETRY OF A NATURAL FRACTURE NETWORK CONDITIONED BY WELL BORE OBSERVATIONS

(71) Applicant: Landmark Graphics Corporation, Houston, TX (US)

(72) Inventors: Rae Mohan Srivastava, Toronto (CA); Jeffrey Marc Yarus, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/894,320

(22) PCT Filed: Aug. 30, 2013

(86) PCT No.: PCT/US2013/057639
§ 371 (c)(1),
(2) Date: Nov. 25, 2015

(87) PCT Pub. No.: WO2015/030809
PCT Pub. Date: Mar. 5, 2015

(65) Prior Publication Data
US 2016/0209545 A1    Jul. 21, 2016

(51) Int. Cl.
*G06G 7/48* (2006.01)
*G01V 99/00* (2009.01)
(52) U.S. Cl.
CPC ........ *G01V 99/005* (2013.01); *G01V 2210/66* (2013.01)

(58) Field of Classification Search
None
See application file for complete search history.

(56) References Cited

U.S. PATENT DOCUMENTS

| | | | | |
|---|---|---|---|---|
| 7,480,205 B2 * | 1/2009 | Wei | ........................ | G01V 1/282 367/37 |
| 7,634,395 B2 * | 12/2009 | Flandrin | ................. | G06T 17/20 345/419 |
| 8,392,165 B2 * | 3/2013 | Craig | ..................... | E21B 43/26 703/10 |
| 8,437,962 B2 | 5/2013 | Craig | | |
| 2002/0120429 A1 * | 8/2002 | Ortoleva | ............. | E21B 41/0064 703/2 |
| 2004/0210547 A1 * | 10/2004 | Wentland | ............. | G06K 9/6253 706/46 |
| 2005/0015231 A1 | 1/2005 | Edwards et al. | | |
| 2009/0194273 A1 | 8/2009 | Surjaatmadja et al. | | |

(Continued)

OTHER PUBLICATIONS

Jing A Three-Dimensional Stochastic Rock Mechanics Model of Engineered Geothermal Systems in Fractured Crystaline Rock Journal of Geophysical Research, vol. 105, No. B10, pp. 23,663-23,679, Oct. 10, 2000.*

(Continued)

*Primary Examiner* — Kibrom K Gebresilassie
*Assistant Examiner* — Cuong Luu

(57) ABSTRACT

The disclosed embodiments include a method, apparatus, and computer program product for providing a geostatistical procedure for simulation of the 3D geometry of a natural fracture network conditioned by well bore observations.

20 Claims, 6 Drawing Sheets

(56) References Cited

U.S. PATENT DOCUMENTS

| | | | |
|---|---|---|---|
| 2010/0066560 A1 | 3/2010 | McDaniel et al. | |
| 2011/0029293 A1* | 2/2011 | Petty | G06F 17/5009 |
| | | | 703/2 |
| 2013/0064040 A1* | 3/2013 | Imhof | G01V 1/30 |
| | | | 367/73 |
| 2013/0124166 A1 | 5/2013 | Clemens et al. | |
| 2013/0215712 A1* | 8/2013 | Geiser | G01V 1/288 |
| | | | 367/9 |
| 2013/0333879 A1* | 12/2013 | Rasheed | E21B 43/26 |
| | | | 166/250.1 |

OTHER PUBLICATIONS

Maerten et al. Three-Dimensional Geomechanical Mmodeling for Consraint of Subseismic Fault Simulation the American Association of Petroleum Geologists, V. 90, No. 9, Sep. 2006, pp. 1337-1358.*
Jing et al. A Three-Dimensional Stochastic Rock Mechanics Model of Engineered Geothermal Systems in Fractured Crystalline Rock Journal of Geophysical Research, vol. 105, No. B10, pp. 23663-23679, Oct. 2000.*
Maerten et al. Three-Dimensional Geomechanical Modeling for Constraint of Subseimic Fault Simulation AAPG Bulletin, V. 90, No. 9, Sep. 2006, pp. 1337-1358.*
International Search Report and Written Opinion, May 26, 2014, 9 pages, International Application Division of Korean Intellectual Property Office.

* cited by examiner

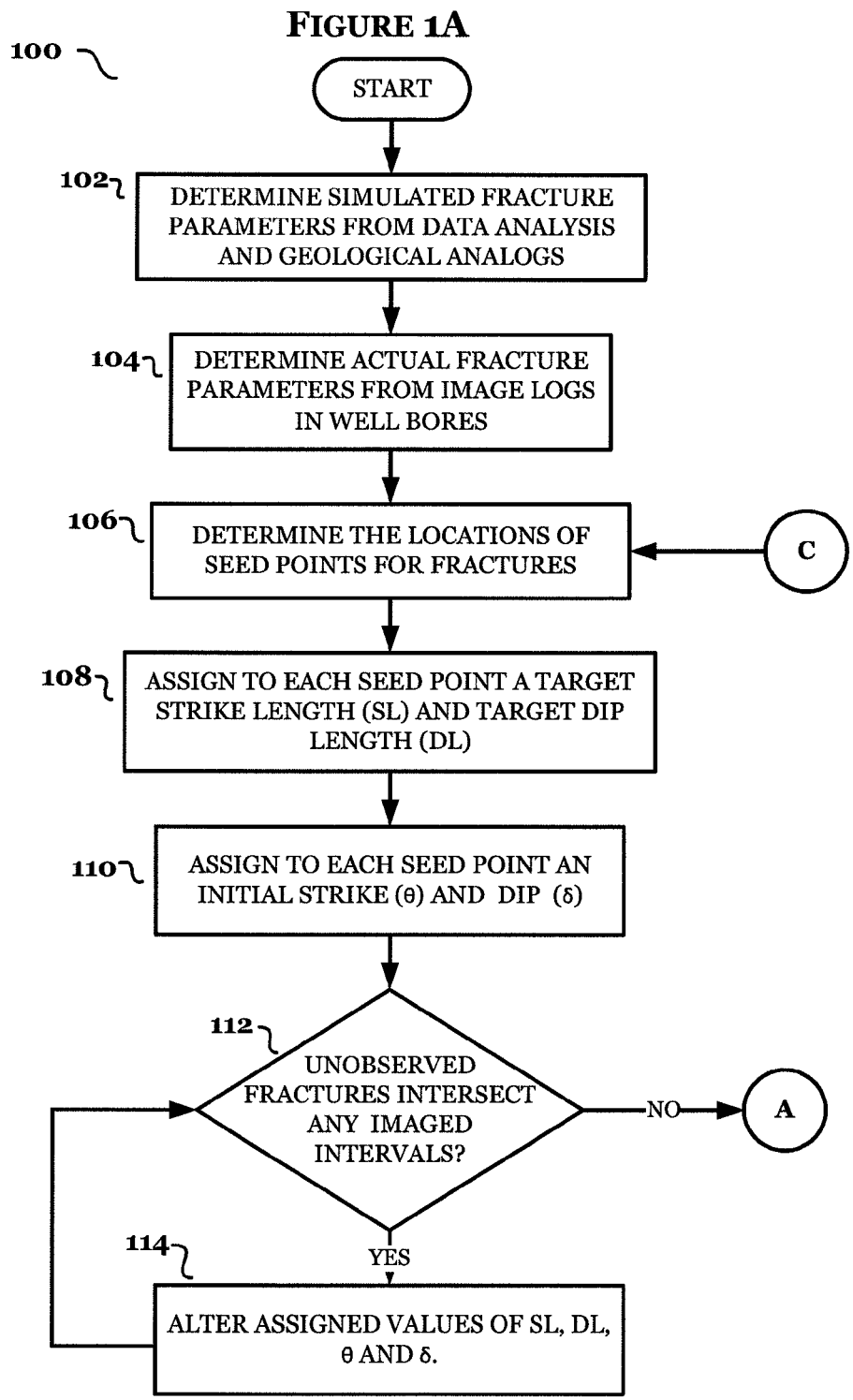

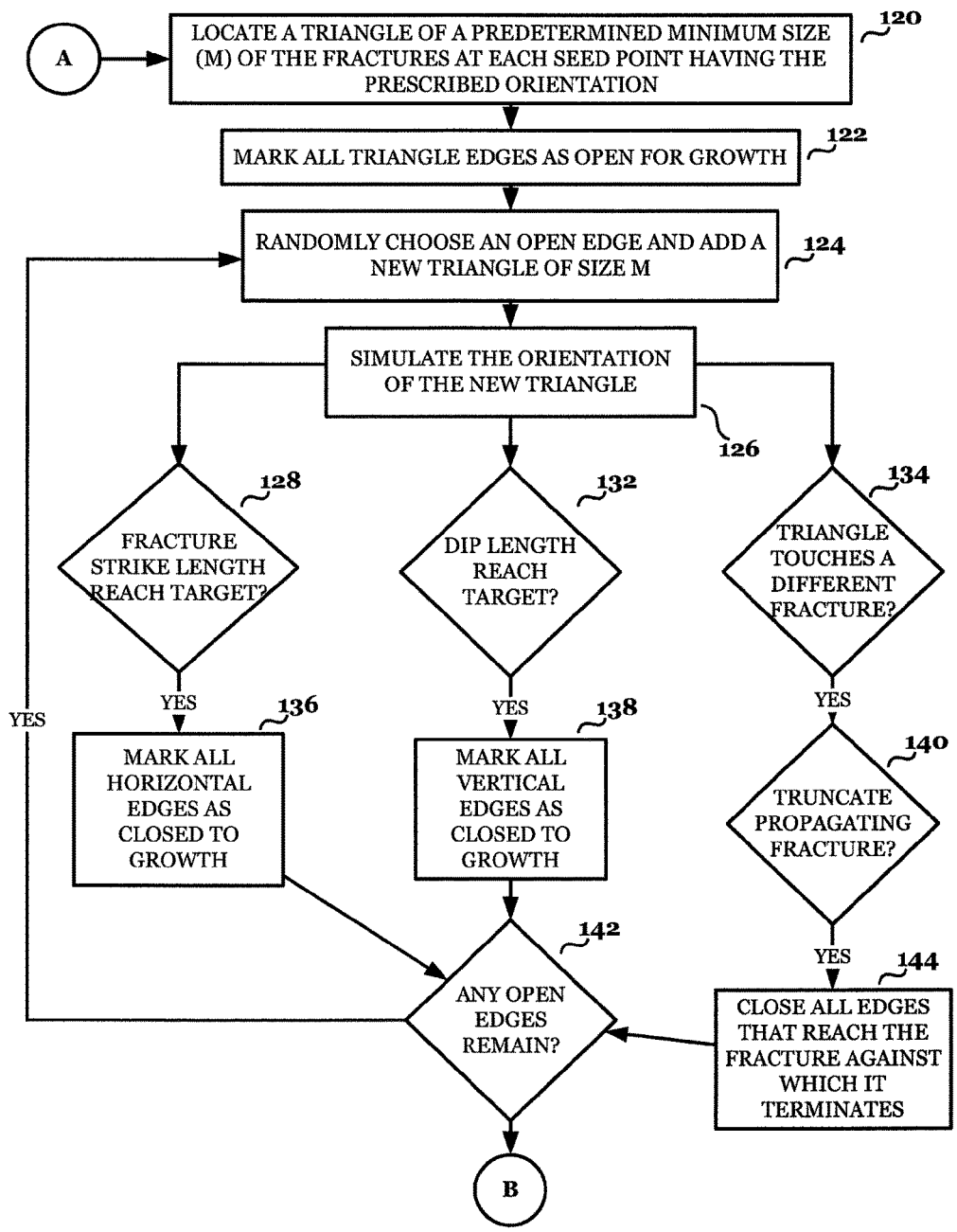

FIGURE 2

```
Determine_Simulated_Fracture_Parameters (geological_analogs){

Determine the minimum size of the fractures to be simulated [M];
    Determine number of fracture sets [NS];
    For Each Fracture Set (i) {
        Determine the cumulative frequency distribution the strike length [L] for fractures in the set [f_L,i];
        Determine the probability distribution of the ratio of strike length to dip length [R] for fractures in the set [f_r,i];
        Determine the probability distribution of the strike angle [θ] for fractures in the set [f_θ,i];
        Determine the probability distribution of the dip angle [δ] for fractures in the set [f_δ,i];
        Determine the degree of clustering of the fractures for fractures in the set [C_i];
        Determine the degree of smoothness of the fracture surfaces for fractures in the set [S_i];
    }
    For each pair of fracture sets (i, j){
        Determine the probability that a fracture from set i truncates against a fracture from set j (Prob{T_ij});
    }
}
```

FIGURE 3

Determine_Actual_Fracture_Parameters (image logs in well bores){

Determine the number of observed fractures;
For each observed fracture{
    Determine location coordinates where it intersects the well bore;
    Determine the strike and dip of the fracture where it intersects the well bore;
}

Determine the number of imaged intervals over which the image log provides data;
For each imaged interval{
    Determine the coordinates of the endpoints of the imaged interval;
}

}

GEOSTATISTICAL PROCEDURE FOR SIMULATION OF THE 3D GEOMETRY OF A NATURAL FRACTURE NETWORK CONDITIONED BY WELL BORE OBSERVATIONS

CROSS-REFERENCE TO RELATED APPLICATIONS

This application is a U.S. National Stage patent application of International Patent Application No. PCT/US2013/057639, filed on Aug. 30, 2013, the benefit of which is claimed and the disclosure of which is incorporated herein by reference in its entirety.

BACKGROUND OF THE INVENTION

1. Field of the Invention

The present invention generally relates to the field of computerized reservoir modeling, and more particularly, to a system and method configured to provide a geostatistical procedure for conditional simulation of the three-dimensional (3D) geometry of a natural fracture network.

2. Discussion of the Related Art

In the oil and gas industry, reservoir modeling involves the construction of a computer model of a petroleum reservoir for the purpose of improving estimation of reserves and making decisions regarding the development of the field. For example, geological models may be created to provide a static description of the reservoir prior to production. In contrast, reservoir simulation models may be created to simulate the flow of fluids within the reservoir over its production lifetime.

One challenge with reservoir modeling is the modeling of fractures within a reservoir, which requires a thorough understanding of flow characteristics, fracture network connectivity, and fracture-matrix interaction. The correct modeling of the fractures is important as the properties of fractures such as spatial distribution, aperture, length, height, conductivity, and connectivity significantly affect the flow of reservoir fluids to the well bore.

BRIEF DESCRIPTION OF THE DRAWINGS

Illustrative embodiments of the present invention are described in detail below with reference to the attached drawing figures, which are incorporated by reference herein and wherein:

FIGS. 1A-1C is a flowchart illustrating a method for conditional simulation of the 3D geometry of a natural fracture network in accordance with the disclosed embodiments;

FIG. 2 is a diagram illustrating an algorithm for determining the simulated fracture parameters from data analysis and geological analogs for performing the conditional simulation of the 3D geometry of a natural fracture network in accordance with the disclosed embodiments;

FIG. 3 is a diagram illustrating an algorithm for determining the actual fracture parameters from image logs in well bores for performing the conditional simulation of the 3D geometry of a natural fracture network in accordance with the disclosed embodiments.

DETAILED DESCRIPTION

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1C:
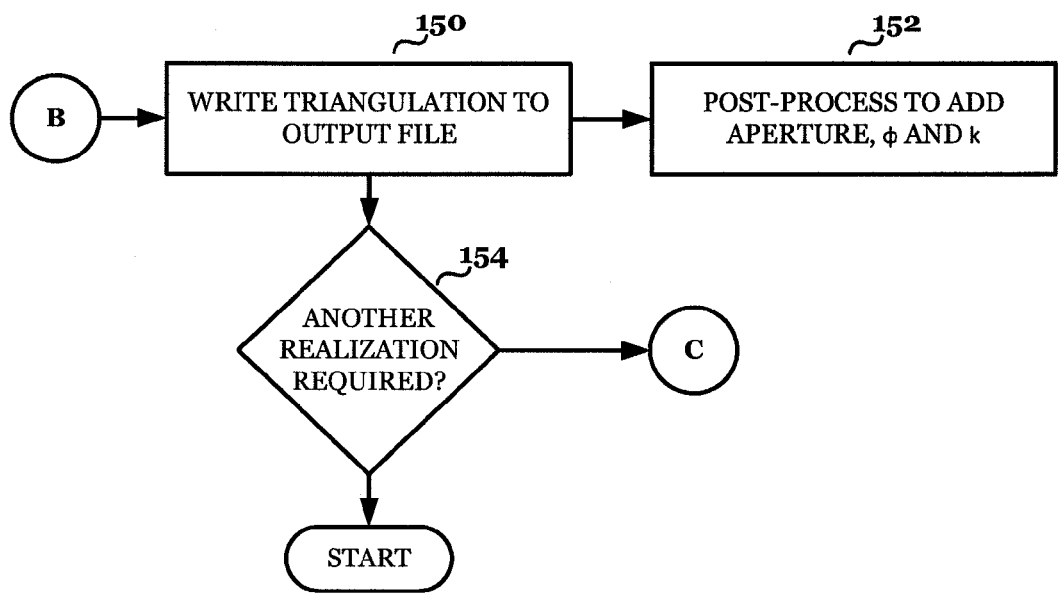

FIGS. 1A-1C is a flowchart illustrating a method 100 for providing conditional simulation of the 3D geometry of a natural fracture network in accordance with the disclosed embodiments. The method 100 begins at step 102 by setting simulated fracture parameters determined from data analysis and geological analogs. For example, FIG. 2 illustrates an algorithm 200 for determining the simulated fracture parameters from data analysis and geological analogs for performing the conditional simulation of the 3D geometry of a natural fracture network in accordance with the disclosed embodiments. As illustrated in FIG. 2, in one embodiment, the algorithm 200 for setting the simulated fracture parameters includes determining the minimum size of the fractures to be simulated (M) and also determining the number of fracture sets (NS).

For each of the fracture set (i), the algorithm 200 determines the cumulative frequency distribution of the strike length (l) for fractures in the set ($f_{l,i}$). In addition, the algorithm 200 determines the probability distribution of the ratio of strike length to dip length (r) for fractures in the set ($f_{r,i}$). The algorithm 200 also determines the probability distribution of the strike angle ($\theta$) for fractures in the set ($f_{\theta,i}$) and the probability distribution of the dip angle ($\delta$) for fractures in the set ($f_{\delta,i}$). Additionally, for each of the fracture set (i), the algorithm 200 determines the degree of clustering of the fractures for fractures in the set ($C_i$) the degree of smoothness of the fracture surfaces for fractures in the set ($S_i$). In one embodiment, the degree of clustering of the fractures is assigned a value ranging from 0 to 1, wherein 1 indicates the highest degree of clustering of the fractures within the set. Similarly, in one embodiment, the degree of smoothness of the fracture surfaces may be assigned a value ranging from 0 to 1, wherein 1 indicates the highest degree of smoothness for the fracture surfaces within the set.

In addition, for each pair of fracture sets (i, j), the algorithm 200 determines the probability that a fracture from set i truncates against a fracture from set j (Prob $\{T_{ij}\}$). Alternatively, in certain embodiments (not depicted), the algorithm 200 may determine a correlation coefficient $r_s$ between a gridded secondary attribute and local fracture density.

Referring back to FIG. 1, following step 102, the method 100 at step 104 determines actual fracture parameters from the image logs in wellbores. For instance, as illustrated in FIG. 3, in one embodiment, the method 100 may execute an algorithm 300 for determining the actual fracture parameters. The algorithm 300 may take as input one or more image logs taken from one or more wellbores. From the image logs, the algorithm 300 determines the number of observed fractures associated with the one or more wellbores. For each observed fracture, the algorithm determines the location coordinates ($x_i$, $y_i$, $z_i$) where the fracture intersects the wellbore and also determines the strike length ($\theta_i$) and dip length ($\delta_i$) of the fracture at the intersection of the fracture and the wellbore. Additionally, the algorithm 300 includes instructions for determining the number of imaged intervals over which the image log provides data. For each image interval, the algorithm 300 determines the coordinates of the endpoints $(x_{1,i}, y_{1,i}, z_{1,i})$ and $(x_{2,i}, y_{2,i}, z_{2,i})$ of the imaged intervals.

Once all the parameters are determined, the method 100 determines the locations of seed points for fractures at step 106. For example, in one embodiment, the method begins with the locations of observed fractures and adds probabilistically selected locations for additional unobserved fractures to reach the target frequency of $F_{L,i}(M)$ in each fracture set. In one embodiment, the selection of locations is controlled by the parameter $C_i$ (the degree of clustering of the fractures within the fracture set). In certain embodiments, the selection of locations may also be controlled by a grid of secondary data, if provided.

At step 108, the method 100 assigns to each seed point a target strike length (SL) and target dip length (DL). In one embodiment, the method 100 assigns the target strike length and target dip length by drawing random values from the cumulative frequency distribution of the strike length (l) for fractures in the set $(F_{1,i})$ and from the probability distribution of the ratio of strike length to dip length (r) for fractures in the set $(f_{r,i})$. The method 100 at step 110 assigns to each seed point an initial strike (θ) and dip (δ), using known orientations at observed locations, and drawing randomly from the probability distribution of the strike angle for fractures in the set $(f_θ)$ and the probability distribution of the dip angle for fractures in the set $(f_δ)$.

At step 112, the method 100 determines whether any unobserved fractures inconsistently intersect any imaged intervals. If the method 100 determines that an unobserved fracture inconsistently intersects an imaged interval, the method 100 at step 114 alters the assigned values of SL, DL, θ and δ. In one embodiment, each of the values may be replaced with a different randomly drawn value from the respective probability distribution. Alternatively, in some embodiments, the method 100 may determine to alter only certain values. For example, in one embodiment, the method 100 may determine that only the initial dip (δ) is altered. Still, in some embodiments, the method 100 may execute an algorithm to determine an adjustment to one or more of the values as opposed to replacing the one or more values with a randomly selected value. The method 100 then repeats step 112 and determines whether any unobserved fractures inconsistently intersect any imaged intervals based on the altered values.

If the method 100 determines at step 112 that the there are no unobserved fractures that inconsistently intersect any of the imaged intervals, the method 100 at step 120, as illustrated in FIG. 1B, locates a triangle of size M (i.e., the minimum size of the fractures to be simulated) at each seed point having the prescribed orientation. The method 100 marks all triangle edges as open for growth at step 122. At step 124, the method 100 randomly selects an open edge and adds a new triangle of size M to the selected open edge. In one embodiment, the method 100 uses a kriging method to simulate the orientation of the new triangle using adjacent triangles as conditioning data.

While performing the kriging method, the method 100 checks for one of three possible scenarios that may occur. One, if the fracture's strike length reaches the target strike length (SL) at step 128, the method 100 at step 136 marks all horizontal edges as closed to growth. Two, if the dip length reaches the target dip length (DL) at step 132, the method 100 at step 138 marks all vertical edges as closed to growth. The third scenario is if a triangle touches a different fracture at step 134. If this occurs, in one embodiment, the method 100 uses the probability that a fracture from the current fracture set truncates against another fracture set (Prob$\{T_{ij}\}$) to decide if the propagating fracture should be truncated. If the method 100 determines that the propagating fracture should be truncated, the method 100 closes all edges that reach the fracture against which it terminates.

Once the method 100 closes an open edge based on the occurrence of the one of the above scenarios, the method 100 determines whether any open edges remain at step 142, and if so, the method 100 repeats the process at step 124 on a remaining open edge. Once all edges are closed, the method 100 writes the triangulation to an output file. The method 100 may perform additional post processing to add aperture, φ and k at step 152.

At step 154, the method 100 determines whether to perform another realization. If additional realizations are needed, the method 100 repeats the above process beginning at step 106. If no additional realizations are needed, the method 100 terminates.

Figure 4:
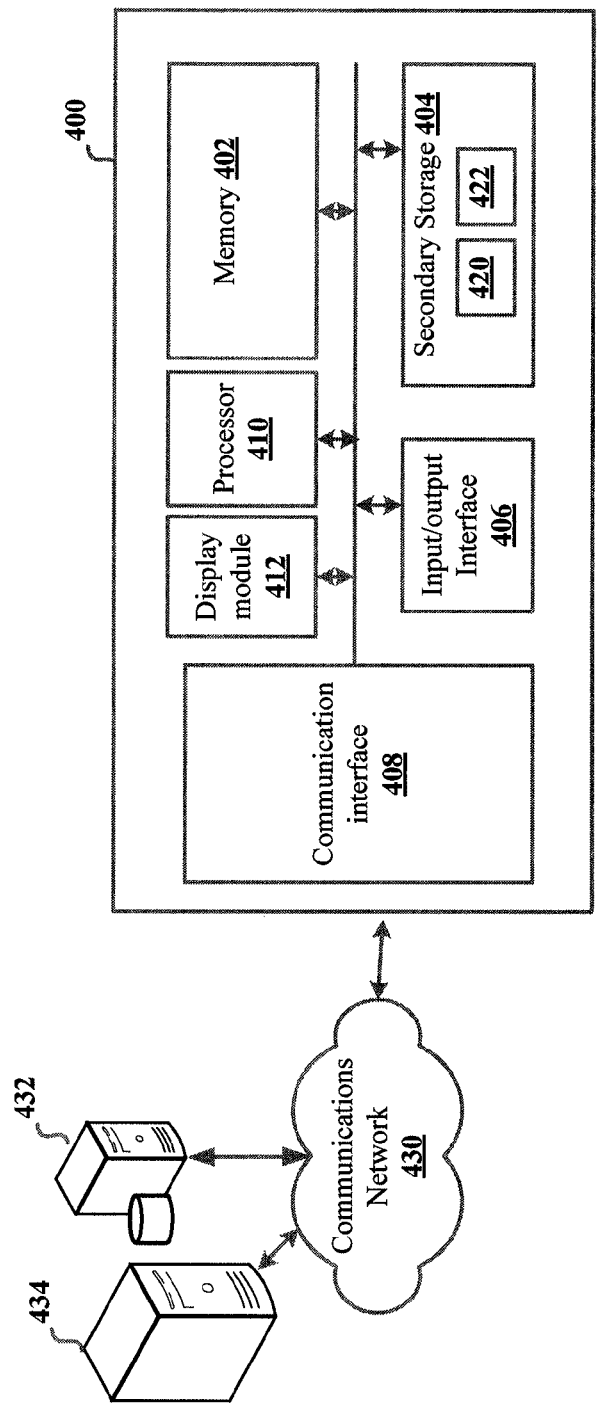
FIG. 4 is a block diagram illustrating one embodiment of a system for implementing the disclosed embodiments.

FIG. 4 is a block diagram illustrating one embodiment of a system 400 for implementing the features and functions of the disclosed embodiments. The system 400 includes, among other components, a processor 400, main memory 402, secondary storage unit 404, an input/output interface module 406, and a communication interface module 408. The processor 400 may be any type or any number of single core or multi-core processors capable of executing instructions for performing the features and functions of the disclosed embodiments.

The input/output interface module 406 enables the system 400 to receive user input (e.g., from a keyboard and mouse) and output information to one or more devices such as, but not limited to, printers, external data storage devices, and audio speakers. The system 400 may optionally include a separate display module 410 to enable information to be displayed on an integrated or external display device. For instance, the display module 410 may include instructions or hardware (e.g., a graphics card or chip) for providing enhanced graphics, touchscreen, and/or multi-touch functionalities associated with one or more display devices. For example, in one embodiment, the display module 410 is a NVIDIA® QuadroFX type graphics card that enables viewing and manipulating of three-dimensional objects.

Main memory 402 is volatile memory that stores currently executing instructions/data or instructions/data that are prefetched for execution. The secondary storage unit 404 is non-volatile memory for storing persistent data. The secondary storage unit 404 may be or include any type of data storage component such as a hard drive, a flash drive, or a memory card. In one embodiment, the secondary storage unit 404 stores the computer executable code/instructions and other relevant data for enabling a user to perform the features and functions of the disclosed embodiments.

For example, in accordance with the disclosed embodiments, the secondary storage unit 404 may permanently store the executable code/instructions of an algorithm 420 for providing a geostatistical procedure for conditional simulation of the 3D geometry of a natural fracture network conditioned by well bore observations as described above. The instructions associated with the algorithm 420 are then loaded from the secondary storage unit 404 to main memory 402 during execution by the processor 400 for performing the disclosed embodiments. In addition, the secondary storage unit 1104 may store other executable code/instructions and data 422 such as, but not limited to, a reservoir simulation application for use with the disclosed embodiments.

The communication interface module 408 enables the system 400 to communicate with the communications network 430. For example, the network interface module 408 may include a network interface card and/or a wireless transceiver for enabling the system 400 to send and receive data through the communications network 430 and/or directly with other devices.

The communications network 430 may be any type of network including a combination of one or more of the following networks: a wide area network, a local area network, one or more private networks, the Internet, a telephone network such as the public switched telephone network (PSTN), one or more cellular networks, and wireless data networks. The communications network 430 may include a plurality of network nodes (not depicted) such as routers, network access points/gateways, switches, DNS servers, proxy servers, and other network nodes for assisting in routing of data/communications between devices.

For example, in one embodiment, the system 400 may interact with one or more servers 434 or databases 432 for performing the features of the present invention. For instance, the system 400 may query the database 432 for well log information in accordance with the disclosed embodiments. In one embodiment, the database 432 may utilize OpenWorks® software available from Landmark Graphics Corporation to effectively manage, access, and analyze a broad range of oilfield project data in a single database. Further, in certain embodiments, the system 400 may act as a server system for one or more client devices or a peer system for peer to peer communications or parallel processing with one or more devices/computing systems (e.g., clusters, grids).

While specific details about the above embodiments have been described, the above hardware and software descriptions are intended merely as example embodiments and are not intended to limit the structure or implementation of the disclosed embodiments. For instance, although many other internal components of the system 400 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media (i.e., a computer program product) include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions, instructions, or code noted in a block diagram or illustrated pseudocode may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Accordingly, the disclosed embodiments provide a system, computer program product, and method for providing a geostatistical procedure for conditional simulation of the 3D geometry of a natural fracture network conditioned by well bore observations. In addition to the embodiments described above, many examples of specific combinations are within the scope of the disclosure, some of which are detailed below.

One example embodiment is a computer-implemented method for generating a simulation of a three dimensional (3D) geometry of a natural fracture network, the method includes determining parameters for performing the simulation of the 3D geometry of the natural fracture network; determining locations of seed points for fractures. The method assigns to each seed point a target strike length and target dip length. The method also assigns to each seed point an initial strike length and an initial dip length. The method located a triangle of a minimum size of the fractures to be simulated at each seed point and marks all edges of the triangle as open for growth. While the triangle has at least one open edge, the method selects an open edge of the triangle and adds new triangles of the minimum size of the fractures to be simulated to the open edge until one condition of a set of conditions is met.

In one embodiment, the set of conditions comprises a strike length of the fracture reaching the target strike length, a dip length of the fracture reaching the target dip length, and the new triangle touching a different fracture. In response to the one condition being met, the method closes at least one open edge of the triangle. For example, in one embodiment, the computer-implemented method closes all horizontal edges of the triangle in response to a determination that the one condition of the set of conditions that is met is the strike length of the fracture reaching the target strike length. In the same embodiment, the method may close all vertical edges of the triangle in response to a determination that the one condition of the set of conditions that is met is the dip length of the fracture reaching the target dip length.

In certain embodiments of the above example embodiment, the parameters are determined from data analysis and geological analogs. In some embodiments, the parameters may include one or more of the following: a minimum size of the fractures to be simulated, a number of fracture sets, a cumulative frequency distribution of the strike length for the fractures in each fracture set, a probability distribution of a ratio of the strike length to the dip length for the fractures in the fracture set, a probability distribution of a strike angle and a probability distribution of a dip angle for the fractures in the fracture set, a degree of clustering of the fractures in the fracture set, and a degree of smoothness of the fractures in the fracture set. In some embodiments, the above example computer-implemented method embodiment may further include determining a probability that a fracture from first set truncates against a fracture from a second set.

Additionally, in some embodiments of the above example computer-implemented method, the parameters are determined from at least one image log of at least one wellbore. In addition, the above computer-implemented method may include determining a number of observed fractures from the at least one image log of the at least one wellbore. For each observed fracture, the computer-implemented method determines a location coordinates where an observed fracture intersects a wellbore and also determines the strike length and the dip length of the observed fracture at the intersection of the observed fracture and the wellbore. Still, in certain embodiments, the computer-implemented method may include the steps of determining a number of imaged intervals over which an image log provides data; and for each image interval, determining coordinates of endpoints corresponding to the imaged interval.

As part of the process of determining the locations of seed points for the fractures, in certain embodiments, the computer-implemented method starts from locations of observed fractures and adds probabilistically selected locations for additional unobserved fractures until a target frequency is reached for a fracture set.

In some embodiments, the computer-implemented method assigns to each seed point the target strike length and the target dip length by respectively drawing random values from a cumulative frequency distribution of the strike length for the fractures in a fracture set and from a probability distribution of a ratio of the strike length to the dip length for the fractures in the fracture set.

Another embodiment of the above disclosed computer-implemented method may include determining whether any unobserved fractures inconsistently intersect any imaged intervals; and altering at least one of the target strike length, the target dip length, the initial strike length, and the initial dip length in response to a determination that an unobserved fracture inconsistently intersects an imaged interval.

A second example embodiment based on the above disclosure is a system, comprising: at least one processor; and at least one memory coupled to the at least one processor and storing computer executable instructions for generating a simulation of a three dimensional (3D) geometry of a natural fracture network, the computer executable instructions comprises instructions for: determining parameters for performing the simulation of the 3D geometry of the natural fracture network; determining locations of seed points for fractures; assigning to each seed point a target strike length and target dip length; assigning to each seed point an initial strike length and an initial dip length; locating a triangle of a minimum size of the fractures to be simulated at each seed point; marking all edges of the triangle as open for growth; and while the triangle has at least one open edge, selecting an open edge of the triangle, repeating a step of adding a new triangle of the minimum size of the fractures to be simulated to the open edge until one condition of a set of conditions is met, the set of conditions comprising a strike length of the fracture reaching the target strike length, a dip length of the fracture reaching the target dip length, and the new triangle touching a different fracture, and closing at least one edge of the triangle in response to the one condition being met.

Still, another example is a non-transitory computer readable medium comprising computer executable instructions for generating a simulation of a three dimensional (3D) geometry of a natural fracture network, the computer executable instructions when executed causes one or more machines to perform operations comprising: determining parameters for performing the simulation of the 3D geometry of the natural fracture network; determining locations of seed points for fractures; assigning to each seed point a target strike length and target dip length; assigning to each seed point an initial strike length and an initial dip length; locating a triangle of a minimum size of the fractures to be simulated at each seed point; marking all edges of the triangle as open for growth; and while the triangle has at least one open edge, selecting an open edge of the triangle, repeating a step of adding a new triangle of the minimum size of the fractures to be simulated to the open edge until one condition of a set of conditions is met, the set of conditions comprising a strike length of the fracture reaching the target strike length, a dip length of the fracture reaching the target dip length, and the new triangle touching a different fracture, and closing at least one edge of the triangle in response to the one condition being met.

The above second and third example embodiments may similarly be modified in various embodiments as described above with respect to the first example embodiment. However the above specific example embodiments and modifications are not intended to limit the scope of the claims. For instance, the example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A computer-implemented method comprising:
   determining parameters for simulating a three dimensional (3D) geometry of a natural fracture network;
   determining locations of seed points for fractures to be simulated;
   assigning to each seed point a target strike length and target dip length;
   locating a triangulated fracture of a predetermined size to be simulated at each seed point;
   marking all edges of the triangulated fracture as open for growth;
   while the triangulated fracture has at least one edge marked open, simulating, by a processor, the 3D geometry of the natural fracture network by:
   selecting the at least one edge of the triangulated fracture that is marked open;
   repeating a step of adding a new triangulated fracture of the predetermined size to be simulated to the at least one edge marked open until at least one of a set of conditions is met, the set of conditions comprising a strike length of the triangulated fracture reaching the target strike length, a dip length of the triangulated fracture reaching the target dip length, and the new triangulated fracture touching a different triangulated fracture within the 3D geometry of the natural fracture network; and marking the at least one edge of the triangulated fracture as closed for growth in response to the at least one condition being met; and estimating reserves of a petroleum reservoir based on the simulation.

2. The computer-implemented method of claim 1, wherein the parameters are determined from data analysis and geological analogs.

3. The computer-implemented method of claim 2, wherein the parameters include a predetermined size of the fractures to be simulated and a number of fracture sets.

4. The computer-implemented method of claim 3, further comprising determining a cumulative frequency distribution of the strike length for the fractures in each fracture set and a probability distribution of a ratio of the strike length to the dip length for the fractures in the fracture set.

5. The computer-implemented method of claim 4, further comprising determining a probability distribution of a strike angle and a probability distribution of a dip angle for the fractures in the fracture set.

6. The computer-implemented method of claim 5, further comprising determining a degree of clustering and a degree of smoothness of the fractures in the fracture set.

7. The computer-implemented method of claim 6, further comprising determining a probability that a fracture from first set truncates against a fracture from a second set.

8. The computer-implemented method of claim 2, wherein the parameters are further determined from at least one image log of at least one wellbore.

9. The computer-implemented method of claim 8, further comprising:

determining a number of observed fractures from the at least one image log of the at least one wellbore; and for each observed fracture, determining a location coordinates where an observed fracture intersects a wellbore, determining the strike length and the dip length of the observed fracture at an intersection of the observed fracture and the wellbore.

10. The computer-implemented method of claim 9, further comprising:

determining a number of imaged intervals over which an image log provides data; and for each image interval, determining coordinates of endpoints corresponding to the imaged interval.

11. The computer-implemented method of claim 1, wherein determining the locations of seed points for the fractures comprises starting from locations of observed fractures and adding probabilistically selected locations for additional unobserved fractures until a target frequency is reached for a fracture set.

12. The computer-implemented method of claim 1, wherein assigning to each seed point the target strike length and the target dip length is performed by drawing random values from a cumulative frequency distribution of the strike length for the fractures in a fracture set and from a probability distribution of a ratio of the strike length to the dip length for the fractures in the fracture set.

13. The computer-implemented method of claim 1, further comprising determining whether any unobserved fractures inconsistently intersect any imaged intervals; and altering the target strike length and the target dip length in response to a determination that an unobserved fracture inconsistently intersects an imaged interval.

14. The computer-implemented method of claim 1, wherein marking the at least one edge of the triangulated fracture as closed in response to the one condition being met comprises marking all horizontal edges of the triangulated fracture as closed in response to a determination that the one condition of the set of conditions that is met is the strike length of the triangulated fracture reaching the target strike length.

15. The computer-implemented method of claim 1, wherein marking the at least one edge of the triangulated fracture as closed in response to the one condition being met comprises marking all vertical edges of the triangulated fracture as closed in response to a determination that the one condition of the set of conditions that is met is the dip length of the triangulated fracture reaching the target dip length.

16. A system, comprising:

at least one processor; and at least one memory coupled to the at least one processor and storing computer executable instructions, which when executed by the processor cause the processor to perform a plurality of functions, including functions to:

determine parameters for simulating a three dimensional (3D) geometry of a natural fracture network;

determine locations of seed points for fractures to be simulated;

assign to each seed point a target strike length and target dip length;

locate a triangulated fracture of a predetermined size to be simulated at each seed point;

mark all edges of the triangulated fracture as open for growth;

simulate the 3D geometry of the natural fracture network; and estimate reserves of a petroleum reservoir based on the simulation, wherein the simulation is performed while the triangulated fracture has at least one edge marked open, and the functions performed by the processor for the simulation include functions to:

select the at least one edge of the triangulated fracture that is marked open;

add a new triangulated fracture of the predetermined size to be simulated to the at least one edge marked open until at least one of a set of conditions is met, the set of conditions comprising a strike length of the triangulated fracture reaching the target strike length, a dip length of the triangulated fracture reaching the target dip length, and the new triangulated fracture touching a different triangulated fracture within the 3D geometry of the natural fracture network; and mark the at least one edge of the triangulated fracture as closed for growth in response to the at least one condition being met.

17. The system of claim 16, wherein the parameters are determined from at least one image log of at least one wellbore, and wherein the computer executable instructions further comprises instructions for:

determining a number of observed fractures from the at least one image log of the at least one wellbore; and for each observed fracture, determining a location coordinates where an observed fracture intersects a wellbore, determining the strike length and the dip length of the observed fracture at an intersection of the observed fracture and the wellbore.

18. The system of claim 17, wherein the computer executable instructions further comprises instructions for:

determining a number of imaged intervals over which an image log provides data; and for each image interval, determining coordinates of endpoints corresponding to the imaged interval.

19. The system of claim 16, wherein the computer executable instructions further comprises instructions for determining whether any unobserved fractures inconsistently intersect any imaged intervals; and altering the target strike length, the target dip length, the initial strike length, and the initial dip length in response to a determination that an unobserved fracture inconsistently intersects an imaged interval.

20. A non-transitory computer readable medium comprising computer executable instructions which when executed causes one or more machines to perform operations comprising:
   determining parameters simulating a three dimensional (3D) geometry of a natural fracture network;
   determining locations of seed points for fractures to be simulated;
   assigning to each seed point a target strike length and target dip length;
   locating a triangulated fracture of a predetermined size to be simulated at each seed point;
   marking all edges of the triangulated fracture as open for growth;
   while the triangulated fracture has at least one edge marked open, simulating the 3D geometry of the natural fracture network by:
   selecting the at least one edge of the triangulated fracture that is marked open;
   repeating a step of adding a new triangulated the fracture of predetermined size to be simulated to the at least one edge marked open until at least one of a set of conditions is met, the set of conditions comprising a strike length of the triangulated fracture reaching the target strike length, a dip length of the triangulated fracture reaching the target dip length, and the new triangulated fracture touching a different triangulated fracture within the 3D geometry of the natural fracture network; and
   marking the at least one edge of the triangulated fracture as closed for growth in response to the at least one condition being met; and
   estimating reserves of a petroleum reservoir based on the simulation.

* * * * *